United States Patent [19]
Kahn

[11] Patent Number: 5,978,649
[45] Date of Patent: Nov. 2, 1999

[54] METHOD AND APPARATUS FOR DYNAMIC CONDITIONAL CHANNEL AUTHORIZATION IN A BROADCAST SYSTEM

[75] Inventor: Raynold M. Kahn, Los Angeles, Calif.

[73] Assignee: Hughes Electronics Corporation, El Segundo, Calif.

[21] Appl. No.: 08/777,287

[22] Filed: Dec. 27, 1996

[51] Int. Cl.[6] .................................................. H04N 7/16
[52] U.S. Cl. ........................ 455/3.1; 348/5.5; 348/10; 348/1; 380/20; 380/23; 380/25; 455/3.2
[58] Field of Search .................... 348/5.5, 10, 11, 348/3, 1; 455/6.2, 6.3, 5.1, 3.2, 4.1, 4.2, 410, 418, 419, 420; 380/20, 23; H04N 7/16, 7/167

[56] References Cited

U.S. PATENT DOCUMENTS

| | | | |
|---|---|---|---|
| 4,528,589 | 7/1985 | Block | 358/122 |
| 4,575,750 | 3/1986 | Callahan | 348/9 |
| 4,677,434 | 6/1987 | Fascenda | 380/23 |
| 4,768,229 | 8/1988 | Benjamin | 348/5.5 |
| 4,989,245 | 1/1991 | Bennett | 380/23 |
| 5,036,537 | 7/1991 | Jeffers | 348/1 |
| 5,272,752 | 12/1993 | Myers | 380/23 |
| 5,440,632 | 8/1995 | Bacon | 348/3 |
| 5,467,397 | 11/1995 | West | 348/5.5 |
| 5,600,364 | 2/1997 | Hendricks | 348/1 |
| 5,619,274 | 4/1997 | Roop | 348/461 |
| 5,652,795 | 7/1997 | Dillon | 380/20 |
| 5,699,104 | 12/1997 | Yoshinobu | 348/5.5 |
| 5,719,943 | 2/1998 | Amada | 380/49 |
| 5,784,683 | 7/1998 | Sistanizadeh | 370/487 |
| 5,864,747 | 1/1999 | Clark | 455/3.2 |

Primary Examiner—John K. Peng
Assistant Examiner—Wesner Sajous
Attorney, Agent, or Firm—John A. Crook; Michael W. Sales

[57] ABSTRACT

In a broadcast system for transmitting a communication signal to a plurality of receiver units, each receiver unit having associated therewith respective authorization information identifying subsets of the communication signal the receiver unit is authorized to process, a method for controlling access to the communication signal includes the step of receiving a conditional instruction. The conditional instruction specifies a modification of the authorization information conditioned upon whether the receiver unit belongs to a receiver unit category. The method further includes the step of executing the conditional instruction to modify the authorization information conditioned upon whether the receiver unit belongs to the receiver unit category.

31 Claims, 6 Drawing Sheets

EPG

| CHANNEL | 8:00 PM | 8:30 PM | 9:00 PM |
|---|---|---|---|
| 1 | NEWS | GAME SHOW | MOVIE |
| 2 | SOAP OPERAS | | TALK SHOW |
| 3 | SPORTS TELECAST | | |
| 4 | MOVIE (continued from 7:00) | | DOCUMENTARY |
| 5 | CARTOONS | CARTOONS | CARTOONS |
| 20 | WIDE, WIDE WORLD OF BASS FISHING | | |
| 21 | TALK SHOW | COOKING WITH CHEF PIERRE | |
| 22 | INFOMERCIAL | NEWS | INFOMERCIAL |
| 23 | THIS WEEK IN ANTHROPOLOGICAL STUDIES | | |

FIG. 6

METHOD AND APPARATUS FOR DYNAMIC CONDITIONAL CHANNEL AUTHORIZATION IN A BROADCAST SYSTEM

BACKGROUND OF THE INVENTION

1. Field of the Invention

The invention relates generally to broadcast systems and, more particularly, to authorization control methods and systems for direct broadcast satellite systems.

2. Description of the Related Art

When a user subscribes to a direct broadcast satellite (DBS) system, the DBS system must be capable of restricting the user's reception of video, audio or data content to only those portions of the DBS system for which the user has subscribed. DBS systems have generally restricted reception through selective authorization of channels. In the Hughes®/DirecTV® Digital Satellite System (DSS®), because each receiver unit has a unique identification number, a control message sent from a central uplink facility via the satellite link can be individually addressed to each new user of the system to specifically authorize the receiver unit to process a particular channel or channel group.

Individually-addressed control messages have also been used outside of the initial subscription process to control channel authorizations on a more temporary basis. For example, the selective authorization of pay-per-view channels has been accomplished through such individually-addressed control messages.

In the DSS system, selective channel authorization in accordance with the above-described method has been accomplished by establishing two sets of eight bit flags. One set of bit flags is established for each subscriber in a memory contained within the receiver unit wherein the enabling of each bit flag represents an authorization for the subscriber to receive a particular channel or channel group. The other set of bit flags is established for each channel provided by the DSS system such that each bit flag represents whether the channel falls within one of the aforementioned channel groups. If corresponding bit flags in the two sets are both enabled, the subscriber may have access to the channel.

The individually-addressed control messages sent from the DSS uplink facility via the satellite link include commands to enable or disable one of the bit flags associated with each subscriber. Enabling a particular bit flag allows the subscriber to receive data for the development of an electronic programming guide (EPG) providing program information for the channels having a corresponding bit enabled. Moreover, the subscriber is also allowed to receive tuning instructions for each such channel. In this way, the above-described bit flag matching method has provided a first level of channel screening for the DSS system.

However, enabling and disabling the bitmap flags via individually-addressed control messages is not suitable for applications requiring the transmission of similar messages to large numbers of subscribers (e.g., one-half of the subscribers in a six million subscriber system). Large numbers of individually-addressed control messages would entail significant time to transmit or would consume significant amounts of bandwidth needed for the transmission of actual video, audio or data content. For the same reasons, the above-described method is also undesirable for applications involving dynamic channel authorizations.

Still further, in order to generate the individually-addressed control messages, it is necessary for the uplink facility to know the identification numbers of those subscribers that must be addressed. At times, the uplink facility may not know which subscribers must be addressed. For example, when a subscriber orders a particular service locally, the identification number of the subscriber will not be known until the locally-known information is transferred to the uplink facility.

SUMMARY OF THE INVENTION

The present invention is useful in a broadcast system for transmitting a communication signal to a plurality of receiver units wherein each receiver unit has authorization information identifying subsets of the communication signal that the receiver unit is authorized to process. The inventive method for controlling access to the content comprises the step of receiving a conditional instruction wherein the conditional instruction specifies a modification of the authorization information conditioned upon whether the receiver unit belongs to a receiver unit category. The method further comprises the step of executing the conditional instruction to modify the authorization conditioned upon whether the receiver unit belongs to the receiver unit category.

In a preferred embodiment, the broadcast system is a satellite broadcast system having a satellite link for transmitting the communication signal to the receiver units. Furthermore, the access control method may comprise the step of storing the authorization information in the form of a set of flags, each flag representing whether the receiver unit is authorized to process a respective channel group. Still further, the receiver unit category may be defined by the authorization information. Each channel is preferably represented by a set of digits to be matched against the set of flags such that each digit is associated with a particular channel group.

In accordance with another aspect of the present invention, a method for controlling access is used in a broadcast system for transmitting a communication signal to a plurality of receiver units wherein each receiver unit has authorization information identifying subsets of the communication signal the unit is authorized to process and descriptive information identifying whether the receiver unit belongs to a receiver unit category. The method comprises the steps of storing the authorization information and the descriptive information and receiving a conditional instruction. The conditional instruction specifies a modification of the authorization information based on the descriptive information. The method further comprises the step of executing the conditional instruction to modify the authorization based on the descriptive information.

In accordance with yet another aspect of the present invention, a reception apparatus is useful in a broadcast system having a communication signal transmitted to a plurality of receiver units wherein each receiver unit has authorization information identifying subsets of the communication signal the receiver unit is authorized to process. The reception apparatus comprises a receiver that receives a conditional instruction. The conditional instruction specifies a modification of the authorization information conditioned upon whether the receiver unit belongs to a receiver unit category. The reception apparatus further comprises a mechanism for executing the conditional instruction to modify the authorization information conditioned upon whether the receiver unit belongs to the receiver unit category.

In accordance with a yet further aspect of the present invention, an access control method is used in a broadcast system having a plurality of units. The access control method includes the step of transmitting a communication signal to the plurality of units. The method further includes the step of transmitting a conditional instruction that specifies a modification of the authorization information conditioned upon whether the unit belongs to a receiver unit category. The authorization information identifies subsets of the communication signal the respective receiver unit is authorized to process.

In accordance with a still further aspect of the present invention, a broadcast satellite system for transmitting a communication signal to a plurality of receiver units wherein the communication signal includes a plurality of subsets comprises a satellite link and means for transmitting via the satellite link a conditional instruction to the plurality of receiver units. The conditional instruction specifies a modification of the subsets of the communication signal each respective receiver unit is authorized to receive conditioned upon the subsets of the communication signal the respective receiver unit is authorized to receive.

BRIEF DESCRIPTION OF THE DRAWINGS

FIG. 6 illustrates a display created by an electronic programming guide generated by the IRD in accordance with the present invention;

DETAILED DESCRIPTION OF THE INVENTION

Figure 1:
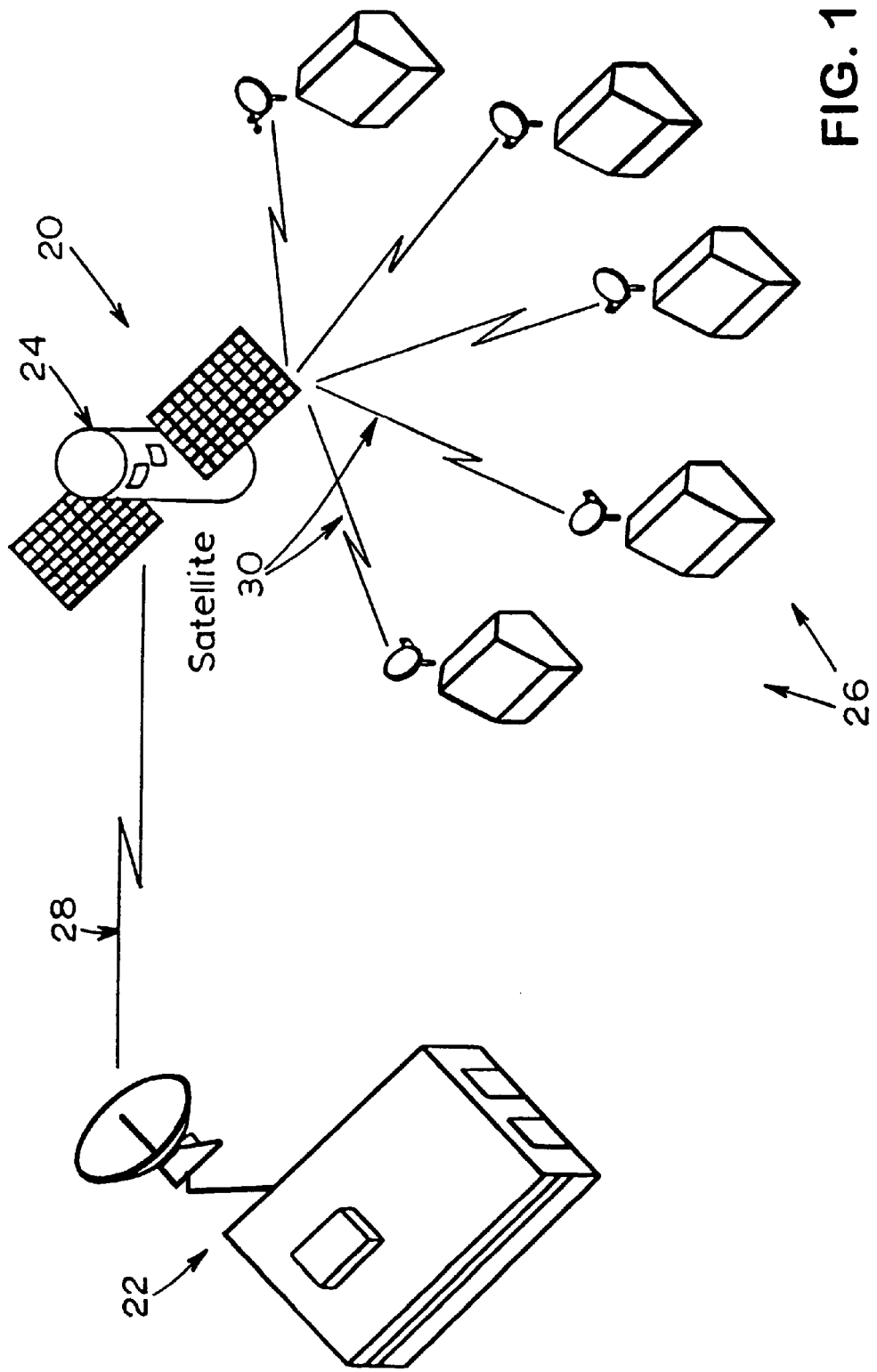
FIG. 1 illustrates a direct broadcast satellite (DBS) system capable of incorporating an access control method of the present invention.

With reference to FIG. 1, a direct broadcast satellite (DBS) system 20 includes a ground-based uplink transmitter 22, a satellite 24 and a plurality of receiver units 26. The ground-based uplink transmitter 22 preferably uplinks a digital uplink signal 28 to the satellite 24 at assigned carrier frequencies, such as between 17.3 GHz and 17.8 GHz, using a plurality of 40 Mbps digital signal carriers having an analog bandwidth of 24 MHz. The satellite 24, preferably a Hughes HS-601™ geostationary satellite (positioned in geo-synchronous orbit at approximately 101° west longitude), includes a plurality of 120 or 240 watt transponders (not shown) that receive and translate the digital uplink signal 28 to carrier frequencies between 12.2 GHz and 12.7 GHz. The satellite 24 further includes a transmitter (not shown) that transmits a broadband digital downlink signal 30 to the receiver units 26, thereby providing, via a satellite link, a plurality of signals on different transponder frequencies.

Each signal is composed of a digital datastream that is modulated according to a quadrature phase shift keying modulation (QPSK) scheme. Prior to modulation, an error correction encoding is applied to the digital datastream. This digital datastream is composed of multiplexed digital signal data packets representative of video, audio or data content associated with anywhere from about five (5) to eight (8) or more individual channels, each of which may be identified with one or more typical television channels provided by the DBS system 20. Each such channel may be broken down into programs wherein each program constitutes a segment of a channel for a particular period of time.

It shall be understood that the present invention is not limited to use in the DBS system 20 described above. In particular, the carrier frequencies and other details relevant to satellite transmission are provided by way of example only. Furthermore, the present invention is not limited to satellite broadcast systems, but more generally may be incorporated into any broadcast system capable of transmitting a communication signal (either analog or digital) having a plurality of subsets which mandate selective authorization capabilities. Still further, each subset need not correspond with a particular channel group, but more generally refers to any grouping of services, or portions thereof, provided by a broadcast system for which video, audio or data content is transmitted via the communication signal.

Figure 2:
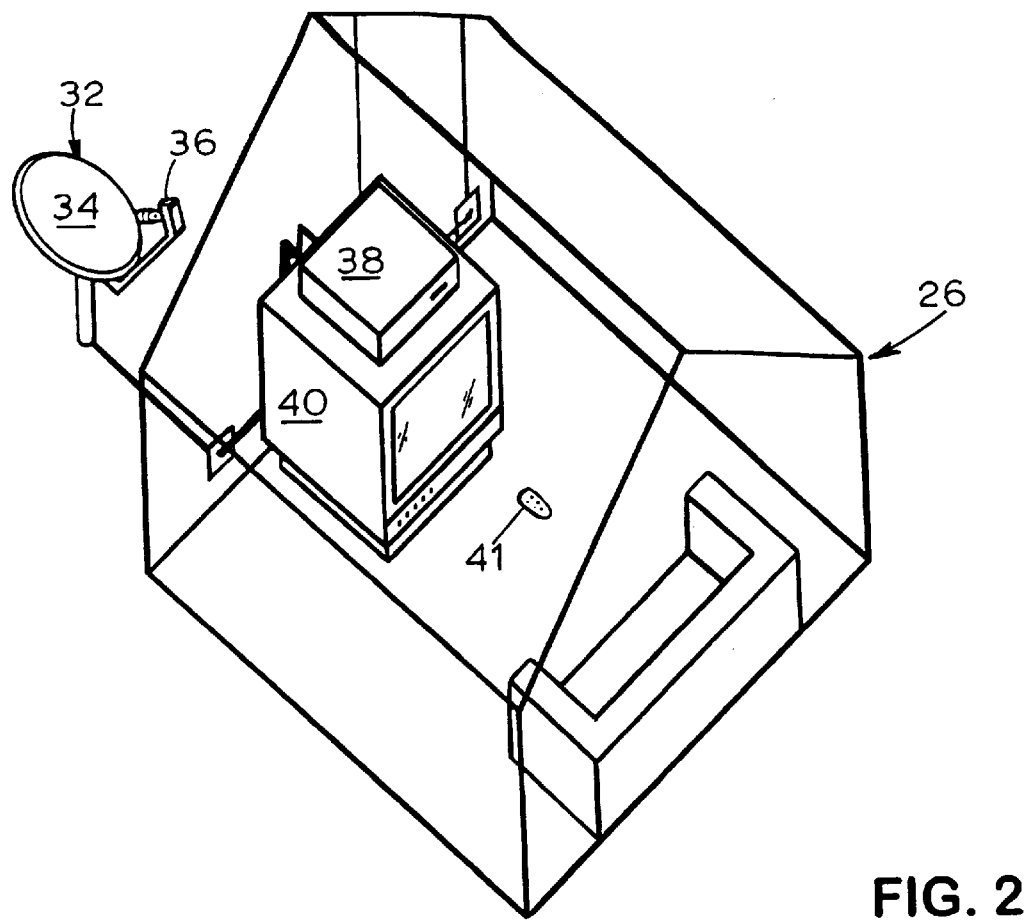
FIG. 2 illustrates a receiver unit of the DBS system of FIG. 1 having an integrated receiver/decoder (IRD) capable of incorporating the access control method of the present invention.

Referring now to FIG. 2, each receiver unit 26 in the DBS system 20 includes a satellite receiver antenna 32 preferably comprising an 18-inch diameter parabolic dish 34 and a low noise block amplifier (or down-converter) 36. The low noise block amplifier 36 collects the broadband digital downlink signal 30 focused by the 18-inch diameter parabolic dish 34 and further shifts the digital broadband downlink signal 30 to an intermediate frequency band, such as the band between 950 and 1450 MHz. The satellite receiver antenna 32 is coupled to a set-top box or integrated receiver/decoder (IRD) 38 which may be responsible for, among other things, tuning, demodulating, error correction decoding, demultiplexing and decrypting the plurality of signals provided in the broadband digital downlink signal 30.

Particular channels or groups of channels may be screened by the IRD 38 in several ways. Initially, the IRD 38 requires tuning instructions for each channel in order to tune to the correct transponder frequency within the broadband digital downlink signal 30 and demultiplex the appropriate digital signal data packets multiplexed in the digital datastream modulated at that frequency. Thus, without the appropriate tuning instructions, the IRD 38 will be prevented from developing, from the broadband digital downlink signal 30, the digital datastream associated with the video, audio or data content of a particular channel.

The digital datastream representative of a particular channel (or channel group) may also be encrypted at the ground-based uplink transmitter 22. The IRD 38 may, thus, be required to obtain access codes necessary for decryption of such encrypted datastreams, thereby providing an additional layer of security from unauthorized reception.

Assuming that the IRD 38 can perform the necessary tuning and decryption, the IRD 38 provides analog or digital signal output to a television monitor 40 or other device (such as an intermediate video cassette recorder) for the presentation of video, audio or data content to a subscribing customer (not shown) on one or more channels transmitted through the DBS system 20. A remote control device 41 may be used by the subscribing customer for selecting a particular channel from those channels the subscribing customer has been authorized to receive.

Figure 3:
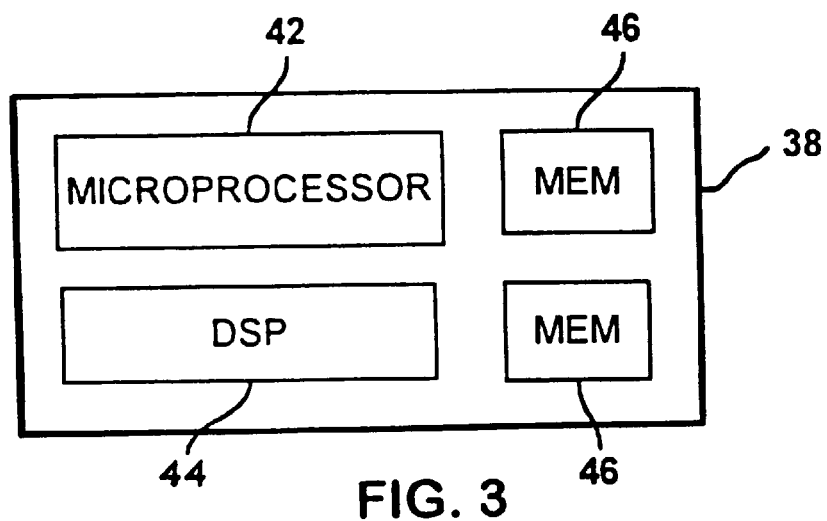
FIG. 3 is a diagrammatic view of the IRD illustrated in FIG. 2.

Referring now to FIG. 3, the IRD 38 may generally include one or more microprocessors 42, one or more digital signal processors (DSP) 44, and a plurality of memories 46 for performing the above-identified functions. In general, the memories 46 (which may comprise one or more random access memories, EEPROMs, shift registers, or other conventional storage devices known to those skilled in the art) temporarily store data during the processing of the digital downlink signal 30 to provide the program content. Some of the microprocessors 42, DSPs 44 and/or memories 46 may be disposed on a replaceable secured authorization card (not shown) or on a fixed authorization module (not shown) disposed within the IRD 38.

One of the microprocessors 42 may serve as a controller for the DSPs 44, each of which may be dedicated to performance of a specialized function, such as demultiplexing the digital signal data packets. Alternatively, some of the specialized functions of the DSPs 44 may be handled by a microprocessor 42 that functions as a controller and, at least to a certain extent, as a signal processor.

The memories 46 generally store, among other things, descriptive information that includes data representative of whether the particular receiver unit 26 falls within a receiver unit category. Each receiver unit category may be defined by any attribute, characteristic or feature of the receiver unit 26 as a whole, the IRD 38 in particular, or the subscribing customer. Examples of receiver unit categories would include all of the receiver units 26 within a particular zip code or group of zip codes, all of the receiver units 26 having a particular model or version of the IRD 38, or all of the customers that have been identified as having an interest in a particular genre of programming (e.g., sports or football). In such cases, the descriptive information is preferably stored in a bitmap 48 composed of a plurality of bitmap flags. The descriptive information is preferably stored in the secured authorization card or module, but may be stored in any of the memories 46 in the IRD 38.

The memory locations in the memories 46 in which the descriptive information are stored may be accessed by the microprocessor 42 when it is necessary to blackout reception of a particular channel for all receiver units 26, for example, in a particular zip code or group of zip codes. In such a case, the microprocessor 42 may not receive the access codes needed to decrypt an encrypted datastream.

Such use of the descriptive information has been utilized by the prior art DSS system. To explain this prior use further, the general format of the datastream should now be described. At periodic intervals (e.g., every couple of seconds) between segments of the datastream having digital signal data packets dedicated to transmitting the video, audio or data content, data packets dedicated to testing the descriptive information ("security packets") will be included. Each such security packet will be analyzed by the microprocessor 42 to determine whether the upcoming encrypted segment should, or can, be decrypted. To this end, the security packet may include a command to have the microprocessor 42 set a blackout bit flag in the memories 46 if, for instance, the zip code value stored in the memories 46 is a particular value. In such an instance, the user would be unable to decrypt or otherwise receive the data contained in the upcoming segment because the blackout bit flag will remain set until another security packet is received, at which time the state of the blackout bit flag is either reevaluated according to the commands in the new security packet or, alternatively, merely reset to zero pending the commands in the new security packet. Thus, the blackout bit flag in the memory 46 temporarily denies reception for the current channel (the channel the user is attempting to receive). Once the user switches to another channel and assuming the user is authorized to obtain the necessary tuning instructions, a new frequency may be tuned to or, at the very least, a new set of the multiplexed digital signal data packets must be selected. Accordingly, a new datastream having its own dedicated security packets will control the status of the blackout bit flag.

Another type of descriptive information preferably stored in the form of bitmap flags in the bitmap 48 is authorization information. The authorization information may generally identify those subsets of the communication signal that a particular IRD 38 is authorized to process. The authorization information may, more particularly, identify those channel groups for which the particular IRD 38 is authorized to obtain tuning instructions. Accordingly, the authorization information, e.g., whether a receiver unit 26 is authorized to receive certain tuning instructions, may also define a receiver unit category.

Figure 4:
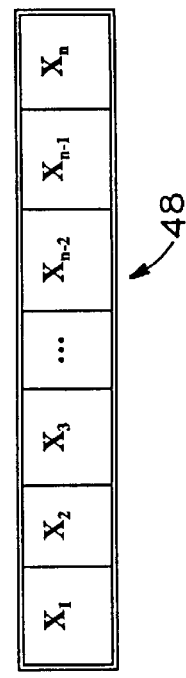
FIG. 4 is a diagrammatic view of an embodiment of a memory of the IRD of FIG. 3.

Referring now to FIG. 4, the memory or memories 46 associated with the storage of the authorization information preferably form a set of bitmap flags $(x_1-x_n)$ in the bitmap 48. Each bitmap flag $(x_i)$ may be associated with a particular subset of the communication signal or, more particularly, a particular service for which a subscriber can subscribe, which preferably constitutes a particular channel group having one or more channels. If the bitmap flag is set to one (1), the user is authorized to receive the tuning instructions for the corresponding channel group. The size of the memory 46 shown in FIG. 4 dictates that the receiver unit 26 may be authorized (or not authorized) to receive tuning instructions for n different channel groups. As is known, to modify the authorizations, the secured authorization card or module may receive individually-addressed electronic mail or other messages via the satellite link to enable or disable the bitmap flags. In other words, using individual addressing involves the conditioning of a particular modification to the authorization information upon whether a particular IRD 38 has an identification number stored in one of the memories 46 that matches the identification number provided via the satellite link.

Each particular channel offered by the DBS system 20 is also represented by a bitmap or, equivalently, a number of binary digits equal to the number of bitmap flags designating the different channel groups. For each channel group for which the particular channel is a member, the appropriate digit is changed from a zero (0) setting to a one (1) setting. Correspondence between the enabled digit and the enabled bitmap flag in the bitmap 48 authorizes the IRD 38 to receive the tuning instructions for that channel. For example, in a DBS system having three different channel groups A, B and C (n=3), a channel that is a member of the groups A and C would have the number 101 associated therewith. If a user had a subscription for channel group A, the first bitmap flag in the bitmap 48 would be enabled by the microprocessor 42. Similarly, if a user had a subscription for channel group C, the third bitmap flag in the bitmap 48 would be enabled by the microprocessor 42. Thus, the IRDs 38 of both users would be allowed to receive the tuning instructions for that channel. In contrast, if a user had neither the first nor third bitmap flags enabled, the IRD 38 of that user would not receive the tuning instructions for that channel.

Additional bitmaps are preferably used to store the other types of descriptive information that can classify each receiver unit 26 in a receiver unit category. For example, each receiver unit 26 in a particular state or other geographic region may have a separate bitmap flag set to one (1) designating that the IRD 38 is within the particular state or geographic region. Another example of descriptive information suitable for storage in a bitmap format would be the recordation of whether a particular auxiliary device is attached to the IRD 38.

Figure 5:
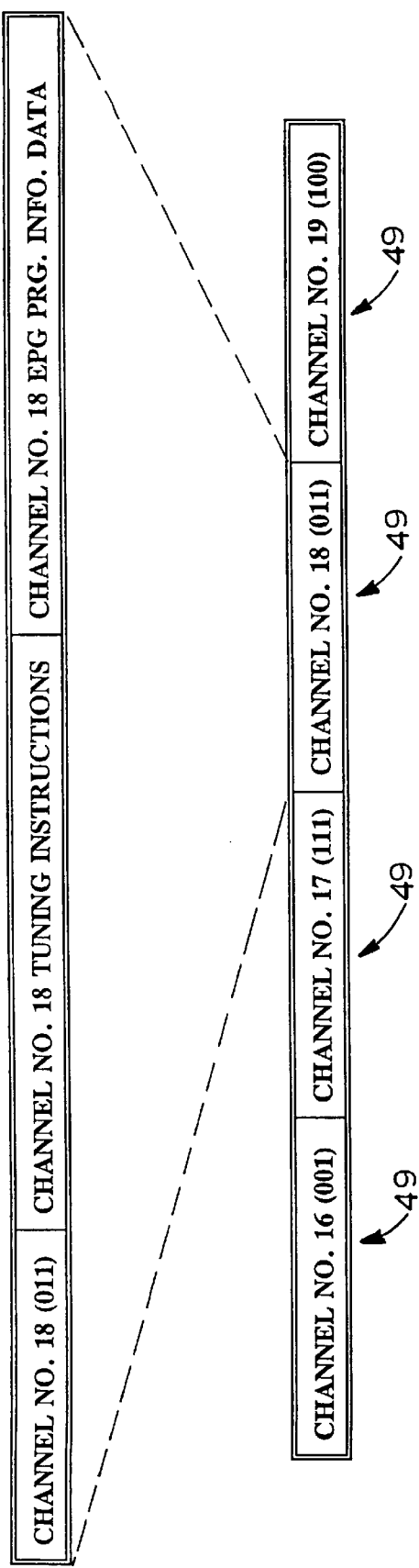
FIG. 5 is a representation of a sample data packet incorporating the access control method of the present invention.

In the DSS system, the above-described channel authorization scheme is implemented concurrently with the development of an electronic programming guide (EPG). As is known, each IRD 38 may develop the EPG from EPG data packets received via the satellite link. The EPG data packets, in part, provide program information that assists the respective subscriber in selecting a program on any authorized channel. To this end, the program information may constitute a title or other short description of the program. As shown in FIG. 5, the format of the EPG data packets includes multiple EPG data packet segments 49, each of which is dedicated to a particular channel. As shown in an expanded view of one particular EPG data packet segment 49 (Channel 18), each EPG data packet segment 49 preferably provides the tuning instructions and EPG program information data for that channel. The EPG program information data is used to generate the above-described program information displayed in the EPG.

At the beginning of each EPG data packet segment 49, the channel may be identified both by an exclusive number (e.g., Channel No. 16 of 25) and by the set of binary digits (e.g., 011) to be compared with the bitmap flags in the bitmap 48 in the secured authorization card or module. In the event that none of the binary digits set to one (1) match up with a bitmap flag set to one (1) in the bitmap 48, the IRD 38 simply ignores the tuning instructions.

An example of an EPG developed by an embodiment of the DBS system 20 is shown in FIG. 6. The EPG displays the program information for a plurality of channels for a certain period of time into the future. Such information may be displayed for only those channels wherein at least one enabled bitmap flag in the bitmap 48 corresponds with the appropriate binary digit received in the EPG data packet segment 49. In the example of FIG. 6, no bitmap flags matched the appropriate binary digit for the Channel Nos. 6–19, and, thus, for that particular user, it is as if such channels do not exist.

It may also be desirable to display the program information for certain channels for which the user has not subscribed as a means for promotion. In such cases, at least one of the associated binary digits and bitmap flags would match, and the IRD 38 would receive the tuning instructions and EPG program information data. However, the DBS system 20 may still restrict the reception of the video, audio or data content for the channel by encrypting the digital datastream prior to developing the digital uplink signal 28. When a subscriber does not have the necessary access codes to decrypt the datastream, a message would appear to the effect of: "You have not subscribed to this channel. Please contact your service provider for subscription information." Therefore, in such a DBS system 20, channel screening through the bitmap 48 would constitute only a first level of channel authorization.

Figure 7:
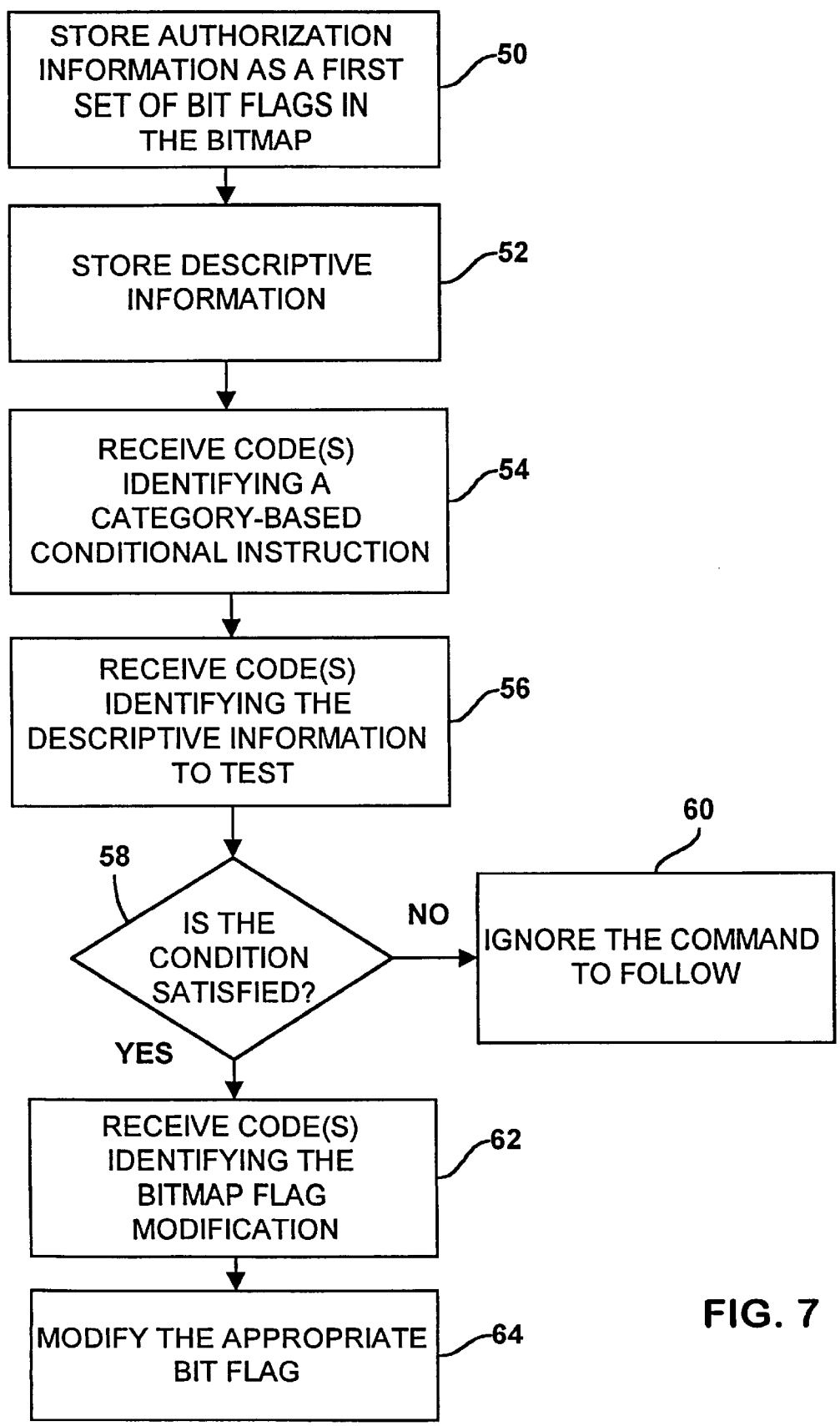
FIG. 7 is a flowchart illustrating the program steps executed by the IRD in accordance with an embodiment of the access control method of the present invention.

In accordance with the program steps shown in FIG. 7, the authorization information may be modified dynamically by category-based addressing based on the status of the descriptive information. The microprocessor 42 in each IRD 38 implements the program steps shown in FIG. 7 to accomplish such a modification of the authorization information. In a preferred embodiment, a block 50 first stores the authorization information in the form of a first set of bitmap flags in the bitmap 48, to the extent the authorization information has not already been recorded. As explained above, each bitmap flag authorizes the IRD 38 to receive the tuning instructions and the EPG program information data for a particular channel or channel group. A block 52 then stores any additional descriptive information in either the bitmap 48 or other memories 46, once again, to the extent it has not already been recorded. After the descriptive information (including the authorization information) has been established in some accessible memory location, a block 54 may receive a data packet segment via the satellite link containing a first code (or codes) that instructs the IRD 38 to expect data to follow representative of a category-based conditional instruction.

After the IRD 38 is alerted to an upcoming category-based addressing process, a block 56 receives a second code (or codes) that defines the receiver unit category that identifies the descriptive information to be tested (i.e., the condition). The IRD 38 subsequently accesses the appropriate location in the memory 46 and a block 58 determines whether the condition is satisfied. If the condition is not satisfied, a block 60 ignores the command to follow or, alternatively, receives a code instructing the IRD 38 to do nothing. In the event the condition is satisfied, a block 62 receives a third code identifying a bitmap flag (representing authorization information) in the bitmap 48 to modify. After the bitmap flag is identified, a block 64 modifies the bitmap flag, thereby authorizing (or potentially deauthorizing) the IRD 38 to process the EPG data packet segments 49 for channels having the corresponding binary digit provided in the EPG data packet segment 49 set to one (1).

Figure 8:
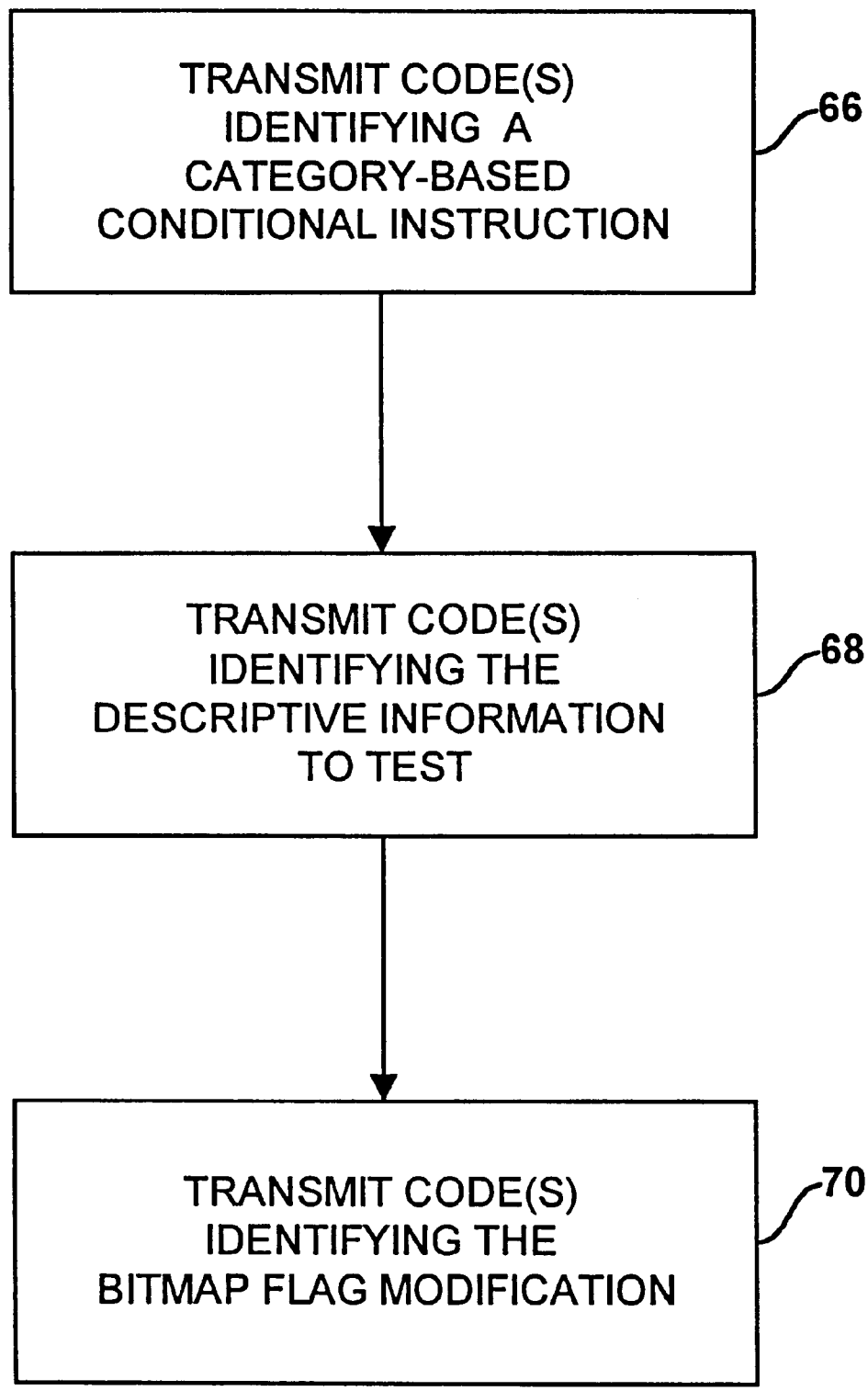
FIG. 8 is a flowchart illustrating the program steps executed by the DBS system in accordance with an embodiment of the access control method of the present invention.

While the above-identified program steps set forth the reception and processing of such conditional instructions by the IRD 38, it should be understood that the present invention also includes the transmission of the above-identified codes by the DBS system 20 via the satellite link for reception by the receiver units 26. Thus, the ground-based uplink transmitter 22 may comprise one or more computer systems, microprocessors or other processors for generating the codes to be transmitted to the receiver units 26 via the satellite link. Alternatively, the codes may be generated by a control unit (not shown) integrally related with the ground-based uplink transmitter 22. Such components of the ground-based uplink transmitter 22, together with the satellite 24, implement the program steps shown in FIG. 8 to generate and send the codes via the satellite link to the receiver units 26. First, a block 66 transmits the code (or codes) identifying a category-based conditional instruction. Soon or immediately thereafter, a block 68 transmits the code (or codes) identifying the receiver unit category or, alternatively, the descriptive information to test. Finally, a block 70 transmits the code (or codes) identifying the conditional bitmap flag modification.

It should also be understood that the above-identified program steps need not occur in precisely the order described herein. For instance, all of the codes may be transmitted and received in a single data packet before any action is taken by the IRD 38. Furthermore, the present invention is not limited to access control methods that initially store the authorization information or other descriptive information—whether in the bitmap 48 or otherwise. For example, a bitmap flag that had not heretofore been set to either zero (0) or one (1) may be set via the satellite link in accordance with the present invention.

By way of example only, an application of the above-described dynamic conditional channel authorization method will now be presented. In a DBS system 20 having a service A (offering Channels Nos. 1–10) and a service B (offering Channels Nos. 6–16), the memory 46 in each IRD 38 has a bitmap 48 with four (4) bitmap flags. For each user having a subscription to service A, the first bitmap flag is enabled. Similarly, the second bitmap flag is enabled for users having a subscription to service B. The third bitmap flag is yet unassigned, and the fourth bitmap flag is enabled for only those receiver units utilizing a particular IRD 38 sold under the name DELUXE IRD.

Assume that service A wishes to promote a special offer limited to those users who have a subscription to service A and have the DELUXE IRD. An efficient way to provide the special offer in such a limited fashion is to transmit, via the satellite link, a conditional instruction conditioned upon a test of the first and fourth bitmap flags. After determining that both the first and the fourth bitmap flags are enabled for a particular IRD 38, the IRD 38 is commanded to enable the third bitmap flag. Subsequently, a new channel, Channel No. 17, will be established with the binary digits 0010. As such, Channel No. 17 will only appear in the EPGs of those users having both a service A subscription and the deluxe IRD. The video, audio or data content provided by Channel No. 17 may now contain promotional material or actual programming that is only being made available to users having an IRD 38 with the third bitmap flag so enabled. Furthermore, such users would also be alerted to the existence of the promotional material or actual programming by the corresponding program information displayed in the EPG for Channel No. 17.

As evidenced by the above example, the present invention is not limited to conditional instructions conditioned upon a single condition. Thus, the conditional instructions may be based on any Boolean test of the descriptive information available for evaluation. Still further, it should be noted that the above-described application has utilized a bitmap flag representation of the memories 46 only for the sake of simplicity. As explained above, other memory schemes and devices known to those skilled in the art may be used to store the descriptive information.

Numerous other modifications and alternative embodiments of the invention will be apparent to those skilled in the art in view of the foregoing description. Accordingly, this description is to be construed as illustrative only. The details of the structure may be varied substantially without departing from the spirit of the invention, and the exclusive use of all modifications which are within the scope of the appending claims is reserved.

I claim:

1. In a broadcast system for transmitting a communication signal to a plurality of receiver units, each receiver unit having associated therewith respective authorization information identifying subsets of the communication signal the receiver unit is authorized to process, a method for controlling access to the communication signal, comprising the steps of:
   receiving a conditional instruction wherein the conditional instruction specifies a modification of the authorization information conditioned upon whether the receiver unit belongs to a receiver unit category; and
   executing the conditional instruction to modify the authorization information conditioned upon whether the receiver unit belongs to the receiver unit category.

2. The method of claim 1, wherein the broadcast system is a satellite broadcast system having a satellite link for transmitting the communication signal to the plurality of receiver units.

3. The method of claim 1, wherein each subset of the communication signal corresponds with a respective channel group having one or more channels.

4. The method of claim 3, wherein the authorization information identifies those channel groups for which the respective receiver unit is authorized to obtain tuning instructions in establishing a programming guide for providing program information.

5. The method of claim 4, wherein the tuning instructions and the program information are provided for one or more channels that the receiver unit is not authorized to receive.

6. The method of claim 5, further comprising the step of storing the authorization information in the form of a set of flags, each flag representing whether the receiver unit is authorized to receive the tuning instructions for the channels in a particular channel group.

7. The method of claim 6, wherein each channel is represented by a set of binary digits to be matched against the set of flags such that each binary digit is associated with a particular channel group.

8. The method of claim 7, further comprising the step of storing in a further set of flags whether the respective receiver unit belongs to the receiver unit category.

9. The method of claim 7, wherein the receiver unit category is defined by the authorization information.

10. In a broadcast system for transmitting a communication signal to a plurality of receiver units, each receiver unit having associated therewith respective authorization information identifying subsets of the communication signal the receiver unit is authorized to process and respective descriptive information identifying whether the receiver unit belongs to a receiver unit category, a method for controlling access to the communication signal, comprising the steps of:
   storing the authorization information and the descriptive information;
   receiving a conditional instruction wherein the conditional instruction specifies a modification of the authorization information based on the descriptive information; and
   executing the conditional instruction to modify the authorization information based on the descriptive information.

11. The method of claim 10, wherein the broadcast system is a satellite broadcast system having a satellite link for transmitting the communication signal to the plurality of receiver units.

12. The method of claim 10, wherein the authorization information identifies those channel groups for which the respective receiver unit is authorized to obtain tuning instructions in establishing a programming guide for providing program information.

13. The method of claim 12, wherein the authorization information is stored in the form of a set of flags, each flag representing whether the receiver unit is authorized to receive the tuning instructions for the channels in a particular channel group.

14. The method of claim 13, wherein the descriptive information is authorization information.

15. A reception apparatus for use in a broadcast system having a communication signal transmitted to a plurality of receiver units, each receiver unit having associated therewith respective authorization information identifying subsets of the communication signal the receiver unit is authorized to process, the reception apparatus comprising:
   means for receiving a conditional instruction wherein the conditional instruction specifies a modification of the authorization information conditioned upon whether the receiver unit belongs to a receiver unit category; and
   means for executing the conditional instruction to modify the authorization information conditioned upon whether the receiver unit belongs to the receiver unit category.

16. The reception apparatus of claim 15, wherein the broadcast system is a satellite broadcast system having a satellite link for transmitting the communication signal to the plurality of units.

17. The reception apparatus of claim 16, wherein the receiving means includes a bitmap memory having the authorization information stored therein in the form of a set of bitmap flags.

18. The reception apparatus of claim 17, wherein the bitmap memory further stores in the form of an additional bit flag whether the receiver unit belongs to the receiver unit category.

19. The reception apparatus of claim 18, wherein the authorization information identifies those channel groups for which the respective receiver unit is authorized to obtain tuning instructions in establishing a programming guide for providing program information.

20. The reception apparatus of claim 19, wherein the receiver unit category is defined by the authorization information.

21. In a broadcast system having a plurality of receiver units, each receiver unit having associated therewith respective authorization information, an access control method comprising the steps of:

transmitting a communication signal to the plurality of receiver units; and transmitting a conditional instruction wherein the conditional instruction specifies a modification of the authorization information conditioned upon whether the receiver unit belongs to a receiver unit category;

wherein the respective authorization information identifies subsets of the communication signal the respective receiver unit is authorized to process.

22. The access control method of claim 21, wherein the broadcast system is a satellite broadcast system having a satellite link for transmitting the communication signal to the plurality of receiver units.

23. The access control method of claim 22, wherein each subset of the communication signal corresponds with a channel group having one or more channels.

24. The access control method of claim 23, wherein the authorization information identifies those channel groups for which the respective receiver unit is authorized to obtain tuning instructions in establishing a programming guide for providing program information.

25. The access control method of claim 24, wherein the tuning instructions and the program information are provided for one or more channels that the receiver unit is not authorized to receive.

26. The access control method of claim 25, wherein the receiver unit category is defined by the authorization information.

27. A broadcast satellite system for transmitting a communication signal to a plurality of receiver units wherein the communication signal includes a plurality of subsets, the broadcast satellite system comprising:

a satellite link; and means for transmitting via the satellite link a conditional instruction to the plurality of receiver units;

wherein the conditional instruction specifies a modification of the subsets of the communication signal each respective receiver unit is authorized to receive conditioned upon the subsets of the communication signal the respective receiver unit is authorized to receive.

28. The method of claim 1, wherein the authorization information identifies channel groups for which the respective receiver unit is authorized to obtain tuning instructions.

29. The method of claim 28, wherein the authorization information includes data indicative of whether each receiver unit belongs to the receiver unit category.

30. The method of claim 21, wherein the authorization information identifies channel groups for which the respective receiver unit is authorized to obtain tuning instructions.

31. The method of claim 30, wherein the authorization information includes data indicative of whether each receiver unit belongs to the receiver unit category.

* * * * *